March 14, 1967 T. L. ETHERINGTON 3,309,219
METHOD OF PRODUCING AN ULTRAVIOLET RESISTANT
POLYCARBONATE ARTICLE
Filed July 12, 1963
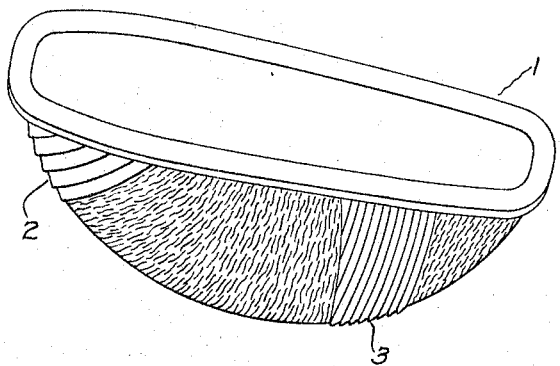
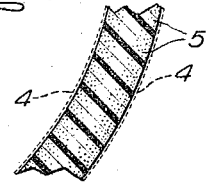
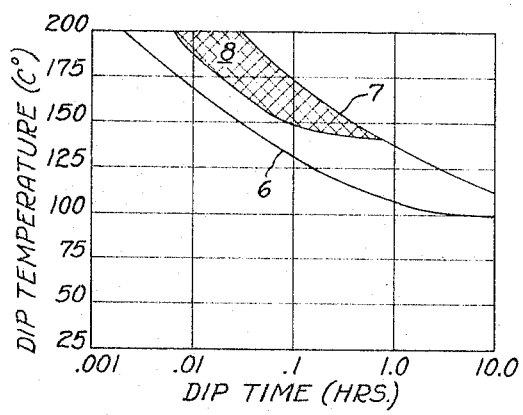
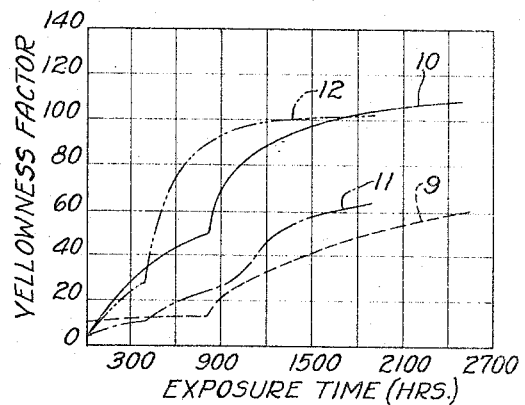
Inventor:
Theodore L. Etherington
by Henry T. Olsen
His Attorney , 3,309,219
METHOD OF PRODUCING AN ULTRAVIOLET RESISTANT POLYCARBONATE ARTICLE
Theodore L. Etherington, Hendersonville, N.C., assignor to General Electric Company, a corporation of New York
Filed July 12, 1963, Ser. No. 294,517
7 Claims. (Cl. 117—33.3)

This invention relates to polycarbonate resin and more particularly to a process for producing formed articles, such as a luminaire refractor, of polycarbonate resin exhibiting a vastly superior resistance to ultraviolet radiation than hitherto available.

The vast majority of all organic polymeric materials undergo some mode of degradation when exposed to the high energy photons of ultraviolet light. Oxygen, moisture and temperature have been shown to play an important role in many cases. The degradation manifests itself depending on the material in yellowing, discoloration, embrittlement and other loss of physical properties. Polycarbonate resin is no exception and it is, therefore, an object of this invention to provide a polycarbonate resin article and method of producing the same which is highly resistant to ultraviolet radiation degradation.

With respect to resin classes, such as polyesters, polyolefins, vinyls, and polystyrene, the use of ultraviolet absorbers to provide protection against ultraviolet attack has been suggested. The absorber functions by reason of its ability to screen out the damaging ultraviolet portion of light due to its very high absorptivity relative to that of the polymer. In order to qualify as a successful ultraviolet light absorber for addition to a polycarbonate resin, there are several requirements which the absorber must fulfill. The absorber must have a high specific absorptivity in the range of wave lengths that are most deleterious to the material and that are present in the source of exposure. The absorber itself must be photochemically stable and be able to dissipate the absorbed energy, for example, as heat energy, without itself being decomposed or causing degradation of the plastic. In addition, the absorber must not significantly absorb in the visible region of the spectrum or a color will be imparted to the material to which it has been added. The absorber must exhibit compatibility with the resin and not degrade it with loss of properties and increase in color. The absorber must also have a sufficiently low volatility to permit the continued residence in the polymer. Two types of organic compound found to fulfill these conditions are the benzophenones and substituted benzotriazoles. Within these groups the members thereof exhibit a variety of usefulness and it is much preferred that either 2,2′ dihydroxy-4,4′ dimethoxy benzophenone or 2(2′-hydroxy 5′-methyphenol) benzotriazole be used in carrying out the invention herein.

The polycarbonate resins used in the practice of this invention are high molecular weight aromatic carbonate polymers which may be prepared by reacting a dihydric phenol with a carbonate precursor such as phosgene, a haloformate or a carbonate ester. Generally speaking, such carbonate polymers may be typified as possessing recurring structural units of the formula

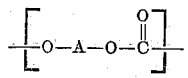

where A is a divalent aromatic radical of the dihydric phenol employed in the polymer producing reaction. By "high molecular weight" aromatic carbonate polymers, I refer to carbonate polymers having intrinsic viscosities (as measured in p-dioxane in deciliters per gram at 30° C.) greater than about 0.40 and preferably above about 0.50. The dihydric phenols which may be employed to provide such aromatic carbonate polymers are mononuclear or polynuclear aromatic compounds, containing as functional groups, 2 hydroxyl radicals, each of which is attached directly to a carbon atom of an aromatic nucleus. Typical dihydric phenols are 2,2 bis-(4-hydroxyphenyl)-propane; 2,2 bis-(4-hydroxyphenyl)-pentane; 2,2 bis-(4-hydroxy 3 methyl phenyl) propane; 2,2 bis-(4-hydroxy 3,5 dichloro phenyl) propane; 2,2 bis (4-hydroxy 3,5 dibromo phenyl) propane; 1,1 bis-(4-hydroxyphenyl)-ethane; 4,4′ dihydroxy 3,3′ dichloro diphenyl ether. A variety of additional dihydric phenols which may be employed to provide such carbonate polymers are disclosed in U.S. Patent 2,993,835, Goldberg, assigned to the assignee of the present invention. It is, of course, possible to employ two or more different dihydric phenols or a dihydric phenol in combination with a glycol, a hydroxy or acid terminated polyester, or a dibasic acid in the event a carbonate copolymer rather than a homopolymer is desired for use in the practice of the invention. It should be understood that the term "polycarbonate resin" embraces within its scope carbonate copolymers.

When a carbonate ester is used as the carbonate precursor in the polymer forming reaction, the materials are reacted at temperatures of from 100° C. or higher for times varying from 1 to 15 hours. Under such conditions ester interchange occurs between the carbonate ester and the dihydric phenol used. The ester interchange is advantageously consummated in an inert atmosphere, such as nitrogen or argon, for example.

Although the polymer forming reaction may be conducted in the absence of a catalyst, one may, if desired, employ the usual ester exchange catalysts, such as, for example, metallic lithium, potassium, calcium and magnesium. Additional catalysts and variations in the exchange methods are discussed in Groggins, "Unit Processes in Organic Synthesis" (4th edition, McGraw-Hill Book Company, 1952), page 616 to 620. The amount of such catalyst, if used, is usually small, ranging from about 0.001 to about 0.1%, based on the moles of the dihydric phenol employed.

The carbonate ester useful in this connection may be aliphatic or aromatic in nature, although aromatic esters, such as diphenyl carbonate, are preferred. Additional examples of carbonate esters which may be used are dimethyl carbonate, diethyl carbonate, phenylmethyl carbonate, phenyltolyl carbonate and di (tolyl) carbonate.

A preferred method for preparing the carbonate polymers suitable for use in the practice of the present invention involves the use of a carbonyl halide, such as phosgene, as the carbonate precursor. The method involves passing phosgene gas into a reaction mixture containing the dihydric phenol and an acid acceptor such as a tertiary amine (e.g., pyridine, dimethylaniline, quinoline etc.). The acid acceptor may be used undiluted or diluted with inert organic solvents as, for example, methylene chloride, chlorobenzene, or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

Another method for preparing the polycarbonate resin useful in the practice of the invention comprises adding phosgene to an alkaline aqueous suspension of the dihydric phenol used. This is preferably done in the presence of inert solvents such as methylene chloride, 1,2 dichloro ethane and the like. Quaternary ammonium compounds may be employed to catalyze the reaction.

A fourth method for preparing such carbonate polymers involves the phosgenation of an agitated suspension of the anhydrous alkali salts of the dihydric phenol used in a non-aqueous medium such as benzene, chlorobenzene, and toluene. This reaction is illustrated by the addition of phosgene to a slurry of the sodium salt of 2,2 bis-(4-hydroxyphenyl)-propane in an inert polymer solvent such as chlorobenzene. The organic solvent should preferably be a polymer solvent but need not necessarily be a good solvent for the reactants.

Generally speaking, the haloformates of dihydric phenols, such as the bishaloformate of 2,2 bis-(4-hydroxyphenyl)-propane, for example, may be substituted for phosgene as the carbonate precursor in any of the methods described above.

In each of the above solution methods of preparation, the carbonate polymer emerges from the reaction in either a true or pseudo solution whether aqueous base or pyridine is used as an acid acceptor. The polymer may be precipitated from the solution by adding a polymer non-solvent, such as heptane or isopropanol. Alternatively, the polymer solution may be heated to evaporate the solvent.

The use of ultraviolet light absorbers in other polymers has either been by addition of the absorber into the bulk material, which may be referred to as bulk stabilization, or by coating the absorber on the surface of the article to be protected. Usually this has been a matter of choice depending on the article, the material or the conditions under which the article is formed. If the absorber is added to the bulk material, it must, of course, have the property of withstanding the temperatures and conditions necessary to form the article. If it is coated on the formed article, it must, of course, form a coating which does not peel or volatilize from the surface of the article. Ordinarily, one would not expect that the results obtained from either process would be vastly different. However, as shall be noted from the hereinafter given examples, a polycarbonate article protected with ultraviolet absorber in accordance with the invention by coating the article exhibits vastly superior characteristics to bulk stabilized polycarbonate material.

It has previously been suggested that the use of plastic materials for refractors or globes for outdoor lighting luminaires is desirable and in some cases plastic refractors or globes have been substituted for the glass previously used. However, the use of plastic refractors has to a large extent been limited to use with luminaries utilizing incandescent lamps or low-wattage discharge lamps because of a continued build-up of discoloration of the plastic under the ultraviolet energy emitted by high voltage lamps such as the mercury arc discharge lamps. Under a high wattage discharge lamp, such as a 400-watt mercury arc lamp, the degradation of plastics referred to above is rapidly accelerated. Not only does the embrittlement of the plastic render it much more susceptible to destruction on impact, but the yellowing is unsightly and interferes with the transmissibility of light through the refractor. It is an object of this invention to provide a refractor or globe of polycarbonate resin for luminaire use in which the above-mentioned disadvantages are greatly reduced, if not completely eliminated.

In accordance with the invention, there is provided a method of producing an ultraviolet light-resistant polycarbonate article comprising the steps of forming an article consisting essentially of polycarbonate resin and then dipping the article into a bath of inert oil containing approximately 1–10% by weight of an ultraviolet absorber to obtain a protective coating of the ultraviolet absorber in the surface of the polycarbonate article.

In accordance with the above-mentioned objects, there is provided a light-transmitting shaped polycarbonate structure for a luminaire which has a surface coating thereon of an ultraviolet absorber which protects the polycarbonate material from degradation as a result of ultraviolet radiation.

The invention will be more clearly understood by referring to the following detailed description in conjunction with the drawing in which:

FIG. 1 is a light-transmitting member having a surface coating of an ultraviolet absorber for a luminaire;

FIG. 2 is an enlarged partial cross-section thereof showing somewhat diagramatically the coating;

FIG. 3 shows the preferred time-temperature relationships in a dip process for producing an ultraviolet resistant article; and FIG. 4 is a series of curves showing the effect of ultraviolet radiation on the polycarbonate resin, both treated and untreated.

The invention will first be described with reference to a specific article. In FIG. 1 there is shown a light transmitting ovate refractor 1 for a luminaire which is composed essentially of a polycarbonate resin, sold commercially under the trademark "Lexan." The groups of refracting prisms 2 and 3 and the internal prisms (not shown) are identical with those shown and described in application S.N. 542,267, Rex, filed Oct. 24, 1955, now Patent 3,283,140 issued Nov. 1, 1966, to which reference is made for a complete description of its structure and function. The exact configuration of the light transmitting member shown is not essential, since this invention is equally applicable to other refractors or light diffusing globes. This polycarbonate material may or may not be bulk stabilized by the inclusion of an ultraviolet absorbing compound such as a substituted benzophenone or a substituted benzotriazole homogeneously therein. In addition, the refractor has been treated so as to provide a coating 4 (FIG. 2) of ultraviolet absorber such as a substituted benzophenone or a substituted benzotriazole. The good penetration of the absorber into the article is indicated by the particles 5 shown as migrated into the article itself. While this is not apparent when a colorless absorber is used, tests using a colored absorber show a gradation of color into the article.

While the article above has been described and shown as having a definite coating layer on the surface thereof, this layer is so thin as to not be observable in actual practice. Therefore, it should be understood that as used herein, the term "coating" not only applies to a definite layer on the surface of the polycarbonate article but also to a high concentration of material near the surface of the article or a combination of the two, so long as produced by the herein disclosed process.

In accordance with the invention, an article consisting essentially of polycarbonate resin is formed in a conventional manner, for example, by injecting polycarbonate material into a mold. Other methods, such as extrusion, cold forming vacuum forming slow molding, compression molding, transfer molding and other methods which will be obvious to one skilled in the art, may be used to form the article. The article may be in any shape and need not be a finished article of commerce, that is, it could be merely sheet material which would be cut or mechanically shaped into a finished article without disturbing the protective coating to be applied by the process. Therefore, as used herein it will be understood that the term "article" refers to any shape of polycarbonate resin whether a finished or stock material so long as the surface coating is not disturbed by any further working operation.

The formed polycarbonate article is then dipped into a bath containing an ultraviolet absorbing compound for a period of time sufficient to effectively coat the surfaces of the article. The temperature of the bath is at least 100° C. The upper limit of the temperature is the distortion point of the polycarbonate article which will vary depending on the time of dip and the thickness of the material.

FIG. 3 shows a dipping time-temperature relationship for effectively coating the polycarbonate article with the ultraviolet absorber. The area between curves 6 and 7 indicates the preferred range of time-temperature for coating the light transmitting member with the desired amount of ultraviolet absorber. The lower curve 6 indicates the minimum time-temperature at which the light transmitting member will be effectively saturated on its surfaces with ultraviolet absorber. The upper curve 7 indicates the time-temperature beyond which the polycarbonate material will have absorbed more the ultraviolet absorbing material than is desirable. Thus, it will be noted that because of the compatibility of the polycarbonate resin with the absorber, a relatively wide range of time durations is available at a given temperature, thereby necessitating a minimum of manufacturing control. Similarly, a relatively broad range of temperatures is permissible for a given time of dip similarly necessitating a minimum of manufacturing control. In the crossed-hatched area 8, shown in FIG. 3, the coating of ultraviolet absorbing particles is applied in a series of dips with time for cooling of the refractor between each dip. This is necessary to avoid distorting the refractor shape when its total mass reaches a temperature above 135° C., the softening point of the polycarbonate resin. The higher temperatures for dips are possible because such material has thermal insulation properties which allow the internal material to remain at a lower temperature than a surrounding medium for an appreciable time lapse.

The ultraviolet absorbing compound in the bath may be any of the known ultraviolet absorbing compounds such as disclosed in U.S. Patent No. 3,043,709 but the preferred compounds are Tinuvin P, Geigy Chemicals' commercial name for 2(2'-hydroxy 5'-methylphenyl) benzotriazole and Uvinul D–49, which is General Aniline's commercial name for 2,2'-dihydroxy-4,4'-dimethoxy benzophenone.

Since the polycarbonate material is attacked by many solvents, the bath must be relatively inert to the polycarbonate material and thus the bath must be of a relatively inert oil such as mineral oil or silicone oil. It is not necessary that the ultraviolet absorber be soluble in the bath. It is merely necessary that the particles be dispersed therein so as to be available for coating onto the polycarbonate mass and, therefore, may be either a suspension or true solution.

It has been found that the polycarbonate refractor treated in the above manner is much more resistant to yellowing due to the ultraviolet radiation to which it was exposed in actual outdoor conditions. An example of this is given as follows: A refractor 1 was formed by injecting polycarbonate resin containing an ultraviolet absorber into a mold. The injection molded polycarbonate refractor was sawed in half in such a manner as to give two symmetrical parts. One half was treated in a bath with an ultraviolet absorbing material by the above-mentioned dipping process. The bath was a dispersion containing 3% of Tinuvin P, Geigy Chemicals' commercial name for 2(2'-hydroxy 5'-methylphenyl) benzotriazole, obtained by heating and stirring the absorber in a clear mineral oil, such as ESSO Primol 355. This dispersion was raised to and held at a temperature of 140° C. One half of the polycarbonate refractor was dipped into the solution and allowed to remain for 30 minutes with brief agitation of the part at five-minute intervals. After removal from the dispersion, the excess mineral oil was removed. Thorough cleaning followed in an ultrasonic cleaner. The two halves of the refractor were then solvent bonded together and installed in a standard commercial fixture operating with a clear mercury arc discharge lamp. The unit was operated out of doors and subjected to all weather conditions. The operating cycle was two hours off, ten hours on during each twelve-hour period, which multiplies the life usage by an acceleration factor of more than two. After the equivalent of six months usage, the treated half of the polycarbonate refractor showed no visible yellowing as a result of ultraviolet radiation from the mercury lamp. The untreated half of the refractor was visibly yellowed. The yellowness factor of the two halves of the refractor was calculated in accordance with the equation wherein the $$\text{yellowness factor} = \frac{T_{6'0} - T_{450}}{T_{560}} \times 100$$

where T is the transmissibility of the refractor section and the subscripts refer to light wave lengths expressed in millimicrons. The injection molded polycarbonate refractor has an inherent yellowness factor of approximately 10. After the equivalent of six months usage, the half of the polycarbonate refractor treated by the above-mentioned dipping process still had a yellowness factor of approximately 10. The untreated half of the refractor had a yellowness factor of approximately 40. Thus, the untreated half of the refractor had a yellowness factor change of 30 over the equivalent of six months life test.

In another example of the invention, a one inch by two inch sample of 1/16 of an inch thick polycarbonate material was given two successive ten-second long dips in a 3% dispersion of ultraviolet absorber in mineral oil at a temperature of 200° C. The ultraviolet absorber in this case was Uvinul D–49, which is General Aniline and Film Corp.'s trade name for 2,2' dihydroxy-4,4' dimethoxy benzophenone. The effect of ultraviolet radiation from a mercury arc lamp on this sample is shown in FIG. 4. Curve 9 shows the small increase in the yellowness factor of the sample treated in accordance with the dipping process as compared with control curve 10 which shows the yellowness factor of a piece of untreated polycarbonate material tested simultaneously therewith. The change in slope of curves 9 and 10 at approximately 700 hours is due to a change in the control temperature environment. Prior to this time the test was run in an environmental temperature of 40° C. and thereafter at 100° C. Thus, it should be noted that the degradation of the polycarbonate material is due to some extent to temperature as well as the ultraviolet radiation. From curves 9 and 10, the greatly decreased susceptibility to degradation of the polycarbonate material when treated in accordance with the invention is readily apparent.

In another example, another one inch by two inch sample of 1/16 inch thick polycarbonate material was given five 30-second duration dips in the solution given in the next above paragraph, the bath in this case being held at a temperature of 165° C. The greatly decreased change in the yellowness factor of the treated material is indicated in curve 11 as compared with an untreated piece of polycarbonate material indicated in control curve 12 of FIG. 2. Again, the change in slope of the curve shown at approximately 400 hours is due to raising the environmental temperature to 100° C. from a prior temperature of 40° C.

From the above, it will be seen that there is provided a process for obtaining ultraviolet resistant polycarbonate articles and a refractor for outdoor lighting luminaires composed of polycarbonate material which is much more resistant to discoloration on exposure to ultraviolet radiation. This refractor has the further advantage that the polycarbonate material is much easier to fabricate than glass and the inherent frangible characteristics of glass are eliminated. Polycarbonate material can be used at a much higher temperature (approximately 30° C.) than other optically suitable thermoplastics.

What is claimed as new and desired to be secured by Letters Patent of the United States is:

1. A process for the manufacture of an article consisting essentially of polycarbonate resin having a high resistance to degradation by ultraviolet light which comprises the steps of forming polycarbonate resin into an article and then dipping said article into an oil bath containing an ultraviolet absorbing compound selected from the group consisting of substituted derivatives of benzophenone and substituted derivatives of benzotriazole, said bath being maintained at a temperature of about 100° C. to about 200° C.

2. A process for the manufacture of an article consisting essentially of a polycarbonate resin having a high resistance to degradation by ultraviolet light comprising the steps of forming polycarbonate resin into an article and then dipping said article into a bath containing a 1–10% by weight of an ultraviolet absorbing compound selected from the group consisting of substituted derivatives of benzophenone and substituted derivatives of benzotriazole in a relatively inert oil selected from the group consisting of mineral oil and silicone oil, said bath being maintained at a temperature of about 100° C. to about 200° C.

3. A process as defined in claim 2 wherein the ultraviolet absorbing compound is 2,2' dihydroxy-4,4' dimethoxy benzophenone.

4. A process as defined in claim 2 wherein the ultraviolet absorbing compound is 2(2'-hydroxy 5'-methylphenyl) benzotriazole.

5. A process as defined in claim 2, wherein said bath contains a solution of said ultraviolet absorbing compound.

6. A process as defined in claim 2, wherein said bath contains a dispersion of said ultraviolet absorbing compound.

7. A light transmitting article composed essentially of a polycarbonate resin having a coating of an ultraviolet light absorbent compound selected from the group consisting of substituted derivatives of benzophenone and benzotriazole, said coating being applied by the process as defined in claim 1.

References Cited by the Examiner

UNITED STATES PATENTS

| | | | |
|---|---|---|---|
| 2,423,780 | 7/1947 | Kollenberg et al. | 117—113 X |
| 2,799,666 | 7/1957 | Caldwell | 260—47 |
| 3,043,709 | 7/1962 | Amborski | 117—7 |
| 3,049,443 | 8/1962 | Coleman | 117—138.8 |
| 3,178,378 | 4/1965 | Winchell | 117—138.8 X |

WILLIAM D. MARTIN, *Primary Examiner.*

T. G. DAVIS, *Assistant Examiner.*